US010295407B2

(12) United States Patent
Frank et al.

(10) Patent No.: US 10,295,407 B2
(45) Date of Patent: May 21, 2019

(54) LIGHT SOURCE HAVING A CONTROLLABLE SPECTRUM

(71) Applicant: Instrument Systems Optische Messtechnik GmbH, Munich (DE)

(72) Inventors: Felix Frank, Munich (DE); Markus Estermann, Babensham (DE); Christoph Kappel, Aschheim (DE); Florian Schewe, Munich (DE); Reto Haring, Munich (DE); Amy Winkler, Cupertino, CA (US); Corin Michael Ricardo Greaves, Munich (DE)

(73) Assignee: INSTRUMENT SYSTEMS OPTISCHE MESSTECHNIK GMBH, Munich (DE)

( * ) Notice: Subject to any disclaimer, the term of this patent is extended or adjusted under 35 U.S.C. 154(b) by 0 days.

(21) Appl. No.: 15/746,109

(22) PCT Filed: Jul. 21, 2016

(86) PCT No.: PCT/EP2016/067441
§ 371 (c)(1),
(2) Date: Jan. 19, 2018

(87) PCT Pub. No.: WO2017/016981
PCT Pub. Date: Feb. 2, 2017

(65) Prior Publication Data
US 2018/0209847 A1   Jul. 26, 2018

(30) Foreign Application Priority Data
Jul. 24, 2015   (DE) .......................... 10 2015 112 111

(51) Int. Cl.
*F21V 7/00*    (2006.01)
*G01J 3/10*    (2006.01)
(Continued)

(52) U.S. Cl.
CPC ............... *G01J 3/10* (2013.01); *G01J 3/0218* (2013.01); *G01J 3/0297* (2013.01); *G01J 3/18* (2013.01);
(Continued)

(58) Field of Classification Search
CPC ......... F21V 7/00; F21V 7/06; G02B 17/0804; G02B 5/10; G03B 21/2013
(Continued)

(56) References Cited

U.S. PATENT DOCUMENTS 2,743,646 A * 5/1956 Strong ...................... G01J 3/12
                                                      250/226
5,726,752 A * 3/1998 Uno ...................... G01N 21/031
                                                      356/244
(Continued)

*Primary Examiner* — Thuy V Tran
(74) *Attorney, Agent, or Firm* — Raymond R. Ferrera; Adams and Reese LLP

(57) ABSTRACT

The invention relates to an apparatus for generating light, comprising a plurality of light sources (1), —a control device (2), which drives the light sources (1), and a superimposition optical unit, which superimposes the light emitted by the light sources (1) in an exit opening (3). It is an object of the invention to provide an apparatus which is improved compared with the prior art. For this purpose, the invention proposes that the superimposition optical unit comprises a first concave mirror (4), in the focal plane of which the light sources (1) are situated, an optical grating (5), onto which the first concave mirror (4) reflects the light (6) emitted by the light sources (1), and —a second concave mirror (7), which reflects the light (8) diffracted at the optical grating (5) onto the exit opening (3) situated at the focus of the second concave mirror (7).

10 Claims, 1 Drawing Sheet

(51) Int. Cl.
 *G01J 3/02* (2006.01)
 *G01J 3/18* (2006.01)
 *G02B 27/10* (2006.01)
 *G02B 27/42* (2006.01)
 *G02B 19/00* (2006.01)
 G02B 17/08 (2006.01)
 G02B 5/10 (2006.01)
 F21V 7/06 (2006.01)
 G01J 3/12 (2006.01)

(52) U.S. Cl.
 CPC ..... *G02B 19/0066* (2013.01); *G02B 27/1086* (2013.01); *G02B 27/425* (2013.01); *F21V 7/00* (2013.01); *F21V 7/06* (2013.01); *G01J 2003/104* (2013.01); *G01J 2003/1286* (2013.01); *G02B 5/10* (2013.01); *G02B 17/0804* (2013.01)

(58) Field of Classification Search
 USPC ......... 362/227, 249.02, 241, 296.01, 296.07; 359/850, 869, 867
 See application file for complete search history.

(56) References Cited

U.S. PATENT DOCUMENTS

2008/0037260 A1\* 2/2008 Wang ................. G02B 27/0961
 362/308
2010/0020538 A1\* 1/2010 Schulz ................. F21V 7/0008
 362/235

\* cited by examiner

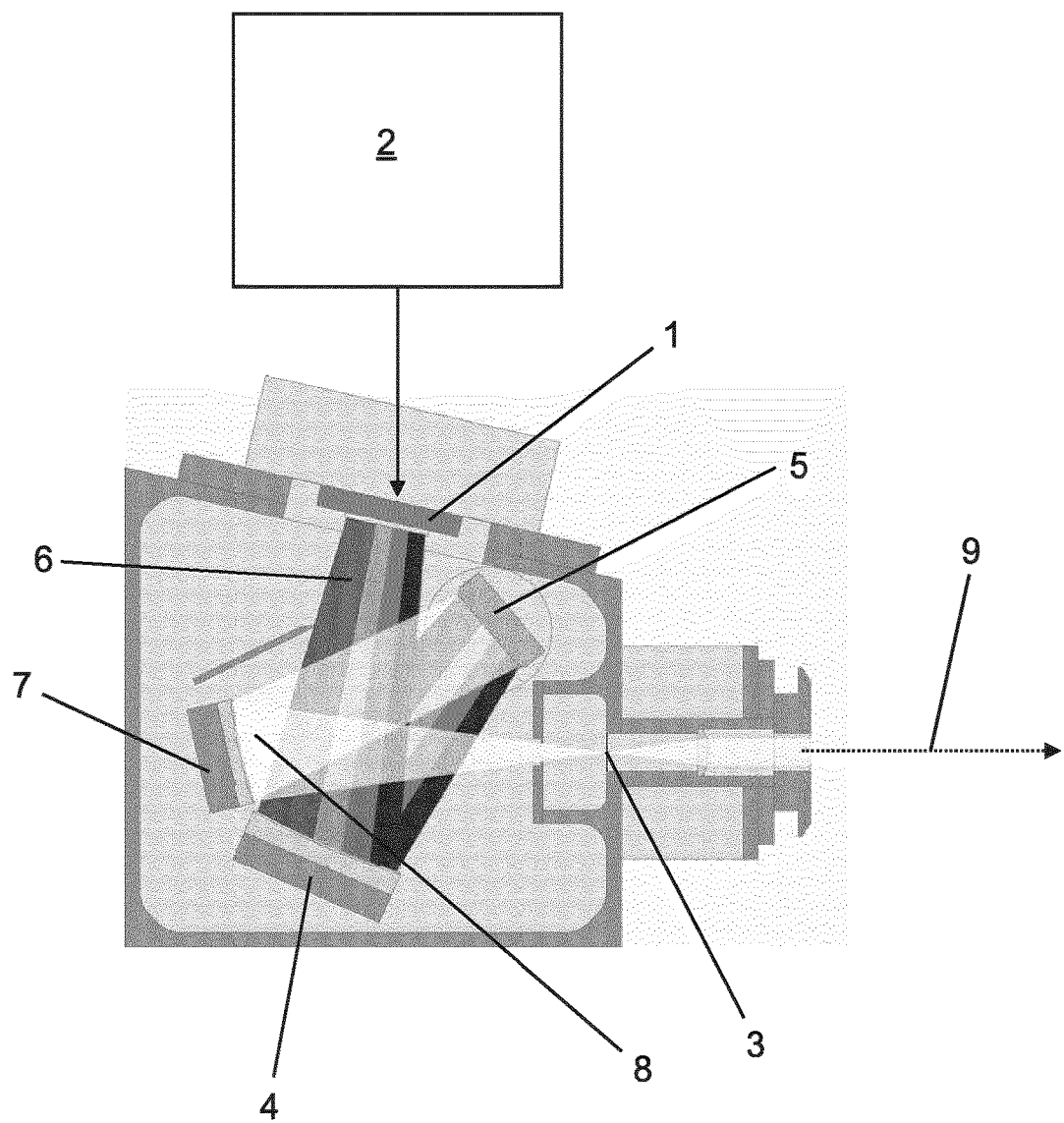

LIGHT SOURCE HAVING A CONTROLLABLE SPECTRUM

The invention relates to an apparatus for generating light, comprising
- a plurality of light sources,
- a control device, which drives the light sources, and
- a superimposition optical unit, which superimposes the light emitted by the light sources in an exit opening.

Such an apparatus is known e.g. from U.S. Pat. No. 6,075,595. The previously known apparatus comprises a plurality of light sources (LEDs) which are arranged alongside one another linearly in a one-dimensional array, specifically with a predefined distance between the individual light sources. An individual dispersive concave mirror is used as superimposition optical unit, said concave mirror being immobile and focusing the light emitted by the light sources onto an exit opening in a wavelength-dependent manner according to the position within the linear arrangement. The light sources are driven by an electronic control device. For this purpose, the control device generates pulsed signals for each individual light source, such that the individual light sources are driven temporally depending on their position in the array such that light having a desired spectrum is generated on average over time in the exit openings. In order to tune the spectrum, the control device correspondingly varies the temporal driving of the light sources. No mechanical movements whatsoever are performed for tuning the spectrum. An important requirement made of the apparatus for generating light having a desired spectrum is that spectral components outside the desired spectral profile are sufficiently suppressed. In order to achieve this, in the previously known apparatus, the individual light sources are arranged in concentrators which ensure emission at a narrowly delimited emission angle. Lateral light emission leading to undesired spectral components in the light leaving the exit opening as a result of scattering is reduced in this way. What is disadvantageous, however, is that the distance between the light sources arranged alongside one another is comparatively large as a result. This detrimentally affects the achievable spectral resolution and the achievable spectral power density. Moreover, it is found that the achievable spectral purity of the light generated is still insufficient for various applications.

It is an object of the invention to provide an apparatus which is improved to compared with the prior art. The disadvantages of the previously known apparatus as discussed above are intended to be avoided.

This object is achieved by the invention in that the superimposition optical unit comprises
- a first concave mirror, in the focal plane of which the light sources are situated,
- an optical grating, onto which the first concave mirror reflects the light emitted by the light sources, and
- a second concave mirror, which reflects the light diffracted at the optical grating onto the exit opening situated at the focus of the second concave mirror.

The invention provides a spectrally tunable light source having the following properties:
- high purity of the spectral light components (little scattered light in the case of undesired spectral components);
- fast tunability in the range of a few milliseconds to seconds;
- high spectral power density.

The heart of the invention is the use of the optical set-up of a spectrograph of the Czerny-Turner type as superimposition optical unit. Said spectrograph is operated "inversely" according to the invention, i.e. not for the spatial separation of spectral components superimposed in an input light beam, but rather for the superimposition of the light of the light sources, said light being emitted at different locations, i.e. spatially separately, in the light beam leaving the apparatus through the exit opening. The detector used in conventional Czerny-Turner spectrographs for detecting the spatially separate radiation components is replaced according to the invention by the arrangement of the light sources in to the focal plane of the first concave mirror. The spectral components contained in the emitted light are then selected according to the spatial position at which the light source is situated, and are superimposed in the exit opening.

The invention makes use of the fact that a very high suppression of scattered light of approximately four orders of magnitude can be produced with the Czerny-Turner arrangement (depending on the requirement profile with corresponding diaphragm configurations and high-quality optical components).

In one possible configuration, two or more of the beam paths of the light emitted by the light sources, of the light reflected onto the optical grating, of the light diffracted at the optical grating and of the light reflected onto the output opening cross one another. This corresponds to the "Crossed Czerny-Turner" configuration known per se in spectrographs, which is distinguished by a very compact design.

In one preferred configuration, the light sources are arranged alongside one another in a linear fashion. The light sources may also be arranged alongside one another and one above another in a matrix-shaped fashion. As a result, it is possible to increase the effective spatial density of the light sources in the focal plane. As a result, it is possible to improve the spectral tunability and at the same time to increase the radiation power in the respective wavelength range.

In order to increase the spatial density, i.e. in order to reduce the distance between the light sources, the light sources may each have an optical fiber, the fiber end of which is situated in the focal plane of the first concave mirror. The fiber ends may be arranged alongside one another and/or one above another with a very small distance between one another which is delimited by the fiber diameter.

The light sources may each comprise one or more light emitting diodes (LEDs). For the output power of the apparatus according to the invention, the spectral power density of the LED is crucial for each wavelength range. Therefore, colored LEDs are advantageous in the blue and red spectral ranges. In the green spectral range, however, white LEDs nowadays have the highest spectral density. The high suppression of scattered light in the Czerny-Turner to arrangement of the superimposition optical unit according to the invention is advantageous especially for white LEDs, in which only a small part of the spectrum is used according to the invention.

By virtue of the superimposition optical unit according to the invention, the spectral distribution around the central wavelength is very similar for each spectral component, even though the emission spectra of the LEDs may be very different. By way of example, blue LEDs typically have a much narrower bandwidth than green LEDs. The spectral width may be configured by the design of the superimposition optical unit (slit width of the exit opening, grating dispersion, size of the light emitting area of each light source, etc.).

Preferably, the control device of the apparatus according to the invention is designed to drive individual and/or simultaneously a plurality of light sources in a pulsed fashion with variable pulse duration and/or pulse frequency.

For the spectral tuning, the individual light sources (LEDs) are switched via the electronic control device. In one variant, a single power source is used and respectively one LED or a subgroup of LEDs is excited via a multiplexer.

Sufficiently fast switching, i.e. temporally sequential, pulsed energization of individual LEDs or individual groups of LEDs, makes it possible to synthesize an arbitrary spectrum by means of time division multiplexing. In an alternative variant, each LED has a dedicated power source drivable by the control device, such that arbitrary spectra can be synthesized without temporal modulation. As a further alternative, a plurality of power sources may be provided which each supply a defined group of LEDs via a multiplexer. The time division multiplexing can thus be accelerated.

In a further preferred configuration of the apparatus according to the invention, the light in the exit opening is coupled into an optical fiber. By means of a suitable fiber-optic assembly, the light generated by means of the apparatus according to the invention can be distributed e.g. among different test facilities. By suitable means, the light can be optimized for homogenous illumination, or it can be focused by suitable means.

The use according to the invention of the Czerny-Turner arrangement as to superimposition optical unit significantly improves the spectral filtering compared with the prior art. This allows white LEDs to be used as light sources and light having high spectral purity nevertheless to be obtained in the exit opening. A high purity is present according to the invention e.g. if 40 nm away from the maximum emission the spectral luminance (with a spectral resolution of 2-3 nm) is less than 0.01% of the maximum.

One exemplary embodiment of the invention is explained with reference to the drawing, in which:

FIG. 1: schematically shows the set-up of an apparatus according to the invention.

The apparatus illustrated comprises an array 1 of LEDs as light sources arranged alongside one another in the illustration plane, which in any case partly differ from one another with regard to the emission spectrum. Colored LEDs are used for the blue and red spectral ranges. White LEDs are used for the green spectral range. It is also possible to use exclusively white LEDs which cover the entire desired spectral range and have a high spectral density.

The LED array 1 is driven by an electronic control device 2.

A superimposition optical unit is provided, which superimposes the light emitted by the LED array 1 in an exit opening 3. The superimposition optical unit comprises a first concave mirror 4, in the focal plane of which the LED array 1 is situated. An optical grating 5 is provided, onto which the first concave mirror 4 reflects the light 6 emitted by the LED array 1. A second concave mirror 7 reflects the light 8 diffracted at the optical grating 5 onto the exit opening 3 situated at the focus of the second concave mirror 7, said exit opening being an exit slit. A collimation optical unit is disposed downstream of the exit opening.

The spectrum of the light 9 leaving the apparatus can be controlled by corresponding driving of the LED array 1 by means of the control device 2. The arrangement of the optical components of the superimposition optical unit to corresponds to that of a crossed Czerny-Turner spectrograph which is operated "inversely" according to the invention.

The invention claimed is:

1. An apparatus for generating light, comprising
a plurality of light sources,
a control device, which drives the light sources, and
a superimposition optical unit, which superimposes a light emitted by the plurality of light sources in an exit opening, wherein the superimposition optical unit comprises
a first concave mirror, in the focal plane of which the light sources are situated,
an optical grating, onto which the first concave mirror reflects the light emitted by the plurality of light sources, and
a second concave mirror, which reflects the light diffracted at the optical grating onto the exit opening situated at the focus of the second concave mirror.

2. The apparatus as claimed in claim 1, wherein two or more of beam paths of the light emitted by the light sources, of the plurality of light reflected onto the optical grating, of the light diffracted at the optical grating and of the light reflected onto the output opening cross one another.

3. The apparatus as claimed in claim 1, wherein the plurality of light sources are arranged alongside one another in a linear fashion.

4. The apparatus as claimed in claim 1, wherein the plurality of light sources are arranged alongside one another and one above another in a matrix-shaped fashion.

5. The apparatus as claimed in claim 1, wherein the plurality of light sources each comprise one or more light emitting diodes.

6. The apparatus as claimed in claim 1, wherein the plurality of light sources each have an optical fiber, the fiber end of which is situated in the focal plane of the first concave mirror.

7. The apparatus as claimed in claim 1, wherein the control device is designed to drive at least one of the plurality of light sources in a pulsed fashion with at least one variable pulse duration and pulse frequency.

8. The apparatus as claimed in claim 1, wherein one of a plurality of the light sources emits white light.

9. The apparatus as claimed in claim 1, wherein one of a plurality of the light sources emits colored light.

10. The apparatus as claimed in claim 1, wherein the light in the exit opening is coupled into an optical fiber.

* * * * *